March 26, 1963
H. D. LANGE
3,082,998
SHOCK ABSORBER
Filed April 7, 1960
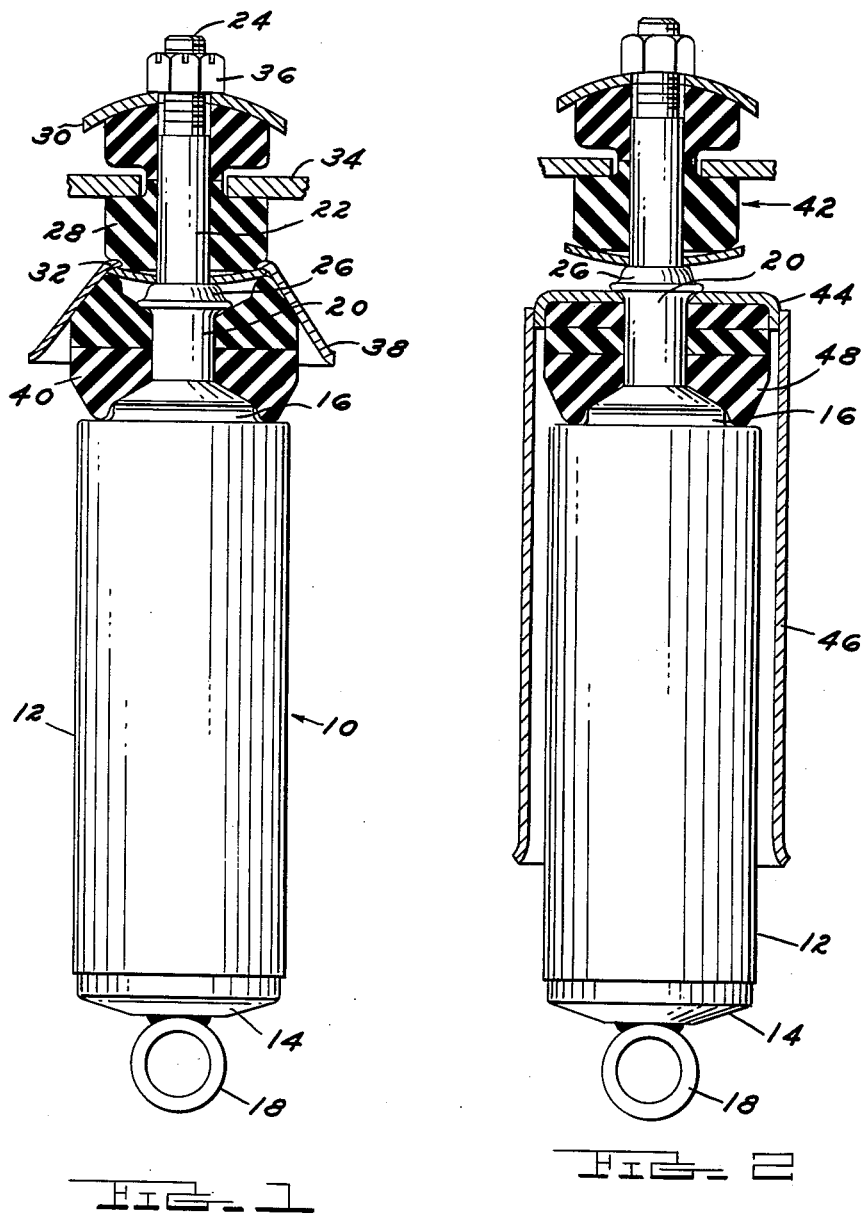
HANS D. LANGE
INVENTOR.
BY John R. Faulkner
Clifford L. Sadler
ATTORNEYS United States Patent Office 3,082,998
Patented Mar. 26, 1963

3,082,998
SHOCK ABSORBER
Hans D. Lange, Chelsea, Mich., assignor to Ford Motor Company, Dearborn, Mich., a corporation of Delaware
Filed Apr. 7, 1960, Ser. No. 20,611
2 Claims. (Cl. 267—8)

The present invention relates to shock absorbers and more particularly to shock absorbers of the reciprocating direct acting type.

The shock absorbers of the present invention are applicable to motor vehicles and more particularly to motor vehicles constructed in accordance with the so-called unit body method. A conventional direct acting shock absorber which is interposed between sprung and unsprung components of a motor vehicle provides a dampening resistance to relative movement between those components. Where operating conditions cause maximum deflection of the unsprung member relative to the sprung portion of the vehicle, mechanical provisions must be made to stop further movement. For example, in an independent front suspension large rubber stops are usually affixed to the lower wheel support arm which will strike against a bracket provided on the vehicle frame.

In a unit body vehicle where the frame is integrally formed of body sheet metal, it is not always possible to conveniently provide the bracket against which the rubber stop may strike. Several solutions have been proposed for this problem, the most common being the provision of a stroke sensitive shock absorber having a built in hydraulic lock feature. This solution has the disadvantage that the shock absorber is usually more complex and therefore more expensive to manufacture.

Therefore, it is an object of the present invention to provide a direct acting hydraulic shock absorber of the reciprocating plunger type which has a resilient stop within the unit and is characterized by its simplicity and economy.

More specifically, the present invention provides in a shock absorber of the type mentioned a rubber stop which is situated between a cup shaped member carried by the piston rod and the end of the shock absorber's reservoir tube.

Further objects and advantages of the present invention will be amply apparent from the following description and accompanying drawings, in which:

FIGURE 1 is an elevational view partly in section of a shock absorber constructed in accordance with this invention, and FIGURE 2 corresponds to FIGURE 1 and discloses a modification thereof.

Referring now to the drawing for a more detailed description, wherein like reference numerals identify like parts throughout the two views, the invention provides a shock absorber 10 of the direct acting hydraulic type having a piston which reciprocates within a pressure tube. In shock absorbers of this type dampening qualities are obtained in part by valved control orifices provided to regulate the resistance of the piston as it passes through the fluid filled pressure tube.

The shock absorber 10 is provided with a cylindrical outer casing 12 which constitutes the reservoir tube of the shock absorber. Tube 12 is sealed at its lower end by closure member 14 and at its upper end by another closure member 16. A ring 18 is welded to the lower closure member 14 and serves as an attaching fixture for securing the shock absorber to unsprung components of the motor vehicle with which the unit 10 is associated. The upper closure member 16 is provided with an aperture and a seal contained therein for sealed engagement with the reciprocating piston rod 20. Concealed within the shock absorber 10 is the lower end of the piston rod 20 which is affixed to the valved piston.

The upper end of the piston rod 20 is provided with means for attachment to a sprung component of the vehicle. The piston rod 20 has a reduced upper end portion 22 and a threaded extremity 24. A washer like member 26 is welded about the rod at the lower end of the reduced portion 22. A bipartite rubber bushing 28 is carried by the reduced portion 22 and is held in position by upper and lower bushing retainers 30 and 32. A metallic piece 34 is interposed between the two portions of the bushing 28 and constitutes the attaching piece for securing the upper end of the shock absorber 10 to the sprung mass of the vehicle. A nut 36 engages the end 24 of the rod 20 and serves to hold the bushing assembly in place.

As an improvement of this construction a frustro-conical collar 38 is fitted over the lower bushing retainer 28 with its inner edge trapped between the retainer 32 and the bushing 28. A bipartite rubber stop 40 having a generally doughnut shape is fitted snugly about the rod 20 just below the collar 26. The upper surface of the rubber stop 40 rests against the inner face of the conical collar 38. Its lower surface is engageable with the closure member 16 for the upper end of the tube 12.

In operation, when the shock absorber 10 is functioning properly the tube 12 will reciprocate with respect to the rod 20. During normal operation, the deflection of the unsprung members of the suspension system with respect to the sprung components will not be great enough for the closure member 16 to strike the rubber stop 40. However, if the vehicle's wheel should strike a bump so as to cause a maximum jounce situation, the shock absorber 10 will close so that the upper closure member 16 will strike the rubber stop 40. This will provide a resilient halt to further movement of the shock absorber and the unsprung suspension members. The configurations of the collar 38 and the rubber stop 40 are selected so that when the latter is struck by the member 16, the resistance will build up progressively as the rubber 40 deflects to fill the space within the collar 38.

Refer now to FIGURE 2 where a modification of the present invention shows a shock absorber having the general configuration of that normally used on the rear suspension of a vehicle. It is similar to the construction of the shock absorber 10 of FIGURE 1 in that it has a reservoir tube 12, and a lower closure member 14 and attaching ring 18 for securing to the axle or some other unsprung portion of the rear suspension system. The upper closure member 16 is similarly indicated in sliding engagement with the piston rod 20 which carries a bushing attachment 42 for sprung members.

Welded to the rod 20 is a collar 26 which positions the bushing assembly 42. A cup shaped member 44 is positioned about the rod 20 adjacent the collar 26 and welded thereto. A cylindrical piece 46 surrounds the reservoir tube 12 and has its upper end welded to the washer 44. The cylinder 46 serves as a dust shield for the shock absorber and retards the flow of dust about the exposed piston rod 20 when the shock absorber is in an extended rebound position.

A rubber stop 48 of three-part construction is snugly fitted about piston rod 20 and against the lower surface of the washer 44. Because of this snug fit, the stop 48 will be carried by the piston rod when there is relative movement between the components of the shock absorber.

The shock absorber of FIGURE 2 operates in a fashion similar to that described in connection with FIGURE 1. If the vehicle with the shock absorber 10 should strike a large bump causing the shock absorber to move into its extreme jounce position, the closure member 16 will strike the rubber cushion 48 causing a resilient halt to further movement in that direction.

The rubber body 48 is shown as being of three layers. Each of the individual layers is selected of an appropriate density to combine to give the desired resilient stop. In addition, the configuration of the rubber 48 is such that as the components of the shock absorber close, the resistance will build up progressively as the rubber stop 48 deflects to fill the space under the cap 44. This is similar in action to the shock absorber of FIGURE 1.

By providing absorbers of the construction shown in FIGURES 1 and 2, an effective stop is provided having substantial economic advantage over heretofore known arrangements. This is particularly evident when it is considered that a rubber stop with its attaching bracket of the unsprung member and the striking flange or bracket for the sprung members is eliminated.

The foregoing description constitutes the preferred embodiment of the present invention; however, further modifications and improvements may occur to those skilled in the art which will come within the scope and spirit of the appended claims.

I claim:

1. A reciprocable shock absorber having a first cylindrical tube, an annular closure member for said tube, a piston rod extending through said member, an annular disc secured to said rod at a point spaced apart from said closure member, a second tube secured to said disc and telescopically related to engaging said first tube, an annular rubber-like member disposed about said rod between said disc and said closure member and slightly spaced from said second tube, said rubber member being adapted to expand outwardly to said second tube when said disc and closure member are brought forcibly together.

2. The combination of claim 1 wherein said rubber-like member comprises a plurality of elements having differing resilient properties.

References Cited in the file of this patent

FOREIGN PATENTS

| | | |
|---|---|---|
| 719,661 | Great Britain | Dec. 8, 1954 |
| 743,411 | Great Britain | Jan. 18, 1956 |
| 811,556 | Great Britain | Apr. 8, 1959 |
| 562,388 | Canada | Aug. 26, 1958 |

OTHER REFERENCES

German application 1,024,390, printed Feb. 13, 1958 (Kl.63h 2/04).